United States Patent Office 3,050,556
Patented Aug. 21, 1962

3,050,556
HALOGENATED ALKANE SULFONYL FLUORIDES
George Van Dyke Tiers, St. Paul, Minn., assignor to Minnesota Mining and Manufacturing Company, St. Paul, Minn., a corporation of Delaware
No Drawing. Filed Sept. 19, 1958, Ser. No. 761,922
4 Claims. (Cl. 260—543)

This invention relates to a new and useful group of mono-chloro-substituted long chain alkanesulfonyl fluorides. This application is a continuation-in-part of my copending application Serial No. 591,812, filed June 18, 1956, now abandoned.

These new compounds are the beta and delta chlorinated long chain chloroalkanesulfonyl fluorides containing from about 8 to about 36 carbon atoms. These compounds correspond to the general formula $$Cl(CHR—CH_2)_nSO_2F$$

wherein R is an alkyl radical of from about 6 to about 16 carbon atoms, and $n$ is an integer of from 1 to 2.

These compounds are useful intermediates in the preparation of a wide variety of materials such as surface active agents, rust and corrosion inhibitors, chelating agents and the like in addition to being useful intermediates in the electro-fluorination process described in Brice and Trott Patent No. 2,732,398.

The fluorosulfonyl group in the novel chloro-substituted long chain alkanesulfonyl fluorides of this invention is quite stable, even at elevated temperatures and relatively rigorous reaction conditions, and possesses "controlled" reactivity in the sense that this group can survive many treatments which affect the chloro-substituent. Thus, the fluorosulfonyl group may be preserved as a further reactive site after the chloro-substituent has been removed and/or replaced by another group. Consequently, these chloro-substituted long chain alkanesulfonyl fluorides combine the desirable aspects of long chain structures with the provision of a plurality of reactive sites which may be individually utilized at the same or separate stages in the building of a variety of useful chemical compounds.

The compounds of the invention can be readily prepared by the reaction of sulfuryl chlorofluoride with an aliphatic hydrocarbon monoolefin in the presence of an initiator for free-radical polymerization. The choice of initiator for free-radical polymerization is one of convenience, suitable initiators being actinic irradiation such as ultra violet light, an organic peroxide or hydroperoxide, or an aliphatic azo compound or the like.

Preparation of the chloro-substituted organic sulfonyl fluorides of this invention by the method indicated above is described in detail in my copending application Serial No. 595,013, filed June 26, 1956, now Patent 2,846,472, issued August 5, 1958.

The examples following illustrate the preparation of the novel compounds of this invention following this procedure.

EXAMPLE 1

To 6.0 (.051 mol) grams of sulfuryl chlorofluoride was added 7.0 (.0585 mol) grams of octene-1 (1:1.1 mol ratio) and the mixture was sealed in a borosilicate glass ampoule in vacuo. The sealed ampoule and its contents were exposed to ultra violet radiation from a quartz-windowed mercury arc lamp for 15 hours at room temperature (approximately 25° C.). When the ampoule was opened, no evolution of gaseous material was noted. The reaction mixture was distilled and a fraction of 8.6 grams of the adduct,

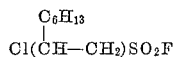

was obtained as a clear, mobile liquid having a boiling point of 158° C. at 40 mm. Hg; $n_D{}^{25}$ 1.4384. Analysis of the adduct showed it to contain 15.4% chlorine and 8.3% fluorine in agreement with the calculated values of 15.39% and 8.25% respectively. The structure was supported by infrared analysis, showing strong —$SO_2F$ bands at about $7.2\mu$ and $8.2\mu$.

EXAMPLE 2

An ampoule was charged with 6.5 grams of sulfuryl chlorofluoride (.055 mol), 15.1 grams of octadecene-1 (.052 mol) (1:1.2 mol ratio) and 0.5 gram of benzoyl peroxide and subsequently sealed in vacuo. The sealed ampoule containing this mixture was then heated at 85° C. for 16 hours while under agitation. Fractional distillation of the crude product yielded 13.85 grams of slightly impure beta-chloro-octadecanesulfonyl fluoride. This compound after recrystallization from hexane had a boiling point range of about 185–190° C. at 0.4 mm. Hg and a melting point range of about 41–42.5° C. The compound was analyzed as containing 9.4% chlorine and 5.7% fluorine as compared with calculated values of 9.45% and 5.15% respectively. The structure of the compound was further supported by infrared analysis as in Example 1.

EXAMPLE 3

Charge A 10.88 lbs. technical (93%) $SO_2FCL$ (10.1 lbs. pure; 0.085 lb. mols)
.50 lb. benzoyl peroxide dissolved in
5.00 lbs. benzene.
10.4 lbs. octene-1 (97% monoolefin) (10.1 lbs.; 0.090 lb. mols).

26.78 lbs. total Charge A

Charge B 1.5 lbs. octene-1 (97%: 1.56 lbs. or 0.013 lb. mols),
.05 lb. benzoyl peroxide dissolved in
.50 lb. benzene 2.05 lbs. total Charge B Total, Charges A+B: 28.83 lbs.

A five-gallon "Monel" (nickel-copper alloy; registered trademark of International Nickel Company) metal kettle designed to operate at 100 p.s.i.g. was evacuated and then charged with all of A except for the octene-1. The temperature of the kettle was raised to 165° F. at which point the pressure was 74 p.s.i.g.

Octene-1 was added cautiously until an exothermic reaction was apparent by the rise of the internal temperature over that of the jacket. This occurred when about one pound had been added. The jacket was allowed to drop to 155° F. and the addition of octene continued at such a rate as to maintain an internal temperature of 190 to 195° F. The pressure dropped steadily and finally reached 34 p.s.i.g. after 3½ hours. Charge B was added and the mixture was held at 195° F. for an hour. A small pressure drop occurred. The kettle was vented at 165° F. and drained while hot. The contents were liquid and nearly colorless and yielded, upon fractional distillation, 18 lbs. of

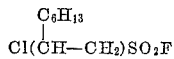

B.P. 137° C. at 20 mm. and 3.1 lbs. of

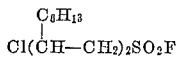

B.P. 175° C. at 2 mm.

The proposed structures were supported by infrared analysis of the respective compounds and by quantitative analysis for the halogen content.

The conversion of these chloroalkanesulfonyl fluorides to unsaturated long chain alkali sulfonates which are useful surfactants, proceeds in accordance with the reaction

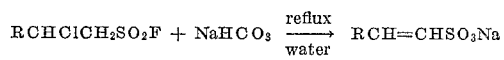

where R is as previously stated. The $C_{12}$ compound, $C_{10}H_{21}CH=CHSO_3Na$, is especially effective and probably represents the optimum chain length for good solubility and high surface activity as can be discerned from the table hereinafter.

TABLE I

| R of RCH= CHSO$_3$Na | Total carbons | Surface Tension in dynes/cm. at 25° C.— Concentration in parts/million H$_2$O | | | | |
|---|---|---|---|---|---|---|
| | | 0.001 | 0.01 | 0.1 | 1.0 | 5.0 |
| C$_6$H$_{13}$ | C$_8$ | ------ | 72 | 72 | 57 | 41.5 |
| C$_{10}$H$_{21}$ | C$_{12}$ | 71 | 34 | 25 | 32 | 35 |
| C$_{12}$H$_{25}$ | C$_{14}$ | 53.5 | 39.5 | 34 | cloudy | ------ |

(Surface tension of water at 25° C., 72.8 dynes/cm.)

As is apparent from the table, these materials all significantly lower the surface tension of water at low concentrations thereby forming useful surfactants.

Many of the compounds of this invention are useful intermediates in the production of sulfonamides by means of reaction with ammonia or amines, these sulfonamides being readily convertible to non-ionic surface active agents, as for example by reaction with ethylene oxide.

The amino alkanesulfonamides, which are readily prepared from the corresponding chloroalkanesulfonyl fluorides by reaction with ammonia, have been found to be epoxy curing agents. They also readily form complexes with several transition metal salts, as is illustrated in the example following.

EXAMPLE 4

2-amino octane sulfonamide (C$_8$ASA in the table following) as a dilute solution in ethanol formed complexes with the metal salts listed in the table.

| | Salt | | C$_8$ASA | | Product | |
|---|---|---|---|---|---|---|
| | Gms. | Moles | Gms. | Moles | Gms. | Color |
| AgNO$_3$ | 3.4 | .02 | 8.32 | .04 | 5.35 | white. |
| CuCl$_2$.2H$_2$O | 2.14 | .0125 | 5.2 | .025 | 2.0 | pale blue. |
| CuCl$_2$.2H$_2$O | .53 | .003 | 3.5 | .017 | 1.31 | bright blue. |
| CoCl$_2$.6H$_2$O | 2.98 | .0125 | 5.2 | .025 | 1.79 | pale violet |
| NiCl$_2$.6H$_2$O | 2.96 | .0125 | 5.2 | .025 | 2.24 | blue-green. |
| FeCl$_2$ | 1.55 | .0125 | 5.2 | .025 | 0.1 | brown. |

The compounds $RCHClCH_2SO_2F$ are relatively stable to hydrolysis, as was illustrated by the refluxing of 3 grams of $C_6H_{13}CHClCH_2SO_2F$ with 75 milliliters of distilled water for 15½ hours, without detectable reaction.

Saponification of the chloroalkanesulfonyl fluorides of this invention is readily carried out by means of sodium hydroxide in aqueous ethanol, the products of saponification being mixtures of $RCH=CHSO_3Na$ and $RCH(OC_2H_5)CH_2SO_3Na$, useful detergents. Removal of the ethanol from the aqueous solution does not appear to prevent the saponification and saponifications have been carried out smoothly without the alcohol being present.

From the foregoing description, and the illustrative examples, the production of the compounds of this invention and various areas of utility therefor will be apparent to those skilled in the art and it is to be understood the invention is to be restricted only as required by the appended claims.

What is claimed is:

1. Chloroalkanesulfonyl fluorides corresponding to the formula $Cl(CHR-CH_2)_nSO_2F$ wherein R is an alkyl radical from 6 to 16 carbon atoms, and $n$ is an integer from 1 to 2.

2. A chloroalkanesulfonyl fluoride corresponding to the formula

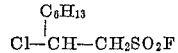

3. A chloroalkanesulfonyl fluoride corresponding to the formula

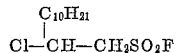

4. A chloroalkanesulfonyl fluoride corresponding to the formula

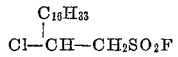

References Cited in the file of this patent

UNITED STATES PATENTS

| 2,046,090 | Reed | June 30, 1936 |
| 2,276,097 | Salzberg | Mar. 10, 1942 |
| 2,742,474 | Mahan | Apr. 17, 1956 |
| 2,783,275 | Scherer et al. | Feb. 26, 1957 |